United States Patent
Pingry et al.

(10) Patent No.: US 6,238,170 B1
(45) Date of Patent: May 29, 2001

(54) AGRICULTURAL IMPLEMENT TRAILER

(75) Inventors: Larry J. Pingry, Celina, OH (US);
Eric L. Stauffer, Portland, IN (US);
William E. Higgs, Coldwater, OH (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 09/614,205

(22) Filed: Jul. 12, 2000

(51) Int. Cl.⁷ ................................... A01B 59/043

(52) U.S. Cl. ........................... 414/550; 414/703; 172/311

(58) Field of Search .................... 414/550, 556, 414/703; 172/311

(56) References Cited

U.S. PATENT DOCUMENTS

| | | |
|---|---|---|
| Re. 30,056 | 7/1979 | Halls . |
| 3,577,715 | 5/1971 | Halls et al. . |
| 3,598,260 | 8/1971 | Hutson . |
| 3,727,698 | 4/1973 | Van Selus . |
| 3,767,231 | 10/1973 | Grosse-Rhode . |
| 3,919,831 | 11/1975 | Halls et al. . |
| 3,959,957 | 6/1976 | Halls . |
| 3,974,880 | 8/1976 | Filan et al. . |
| 3,983,943 | 10/1976 | van der Lely . |
| 4,019,753 | 4/1977 | Kestel . |
| 4,032,169 | 6/1977 | Filan et al. . |
| 4,042,044 | 8/1977 | Honnold . |
| 4,048,929 | 9/1977 | Zumbahlen . |
| 4,060,259 | 11/1977 | Mefferd et al. . |
| 4,108,089 | 8/1978 | van der Lely . |
| 4,137,852 | 2/1979 | Pratt . |

(List continued on next page.)

FOREIGN PATENT DOCUMENTS

| | | |
|---|---|---|
| 912875 | 6/1954 | (DE) . |
| 941820 | 4/1956 | (DE) . |
| 2535268 | 2/1977 | (DE) . |

(List continued on next page.)

OTHER PUBLICATIONS

German Abstract No. DE 3150–335–A, Jul. 14, 1983.
Russain Abstract No. 1001–878–A, Mar. 7, 1983.
Johnson, Harold, "Kinze Unveils New 'Twin Line' Planter", Nov. 18, 1984, vol. 8, No. 6.
"The Transporter" Tensas Machine & Manufacturing, 2 pgs.

*Primary Examiner*—Steven A. Bratlie
(74) *Attorney, Agent, or Firm*—Biebel & French

(57) ABSTRACT

An agricultural implement trailer for supporting one of a plurality of implements for field usage and transport. The trailer includes a trailer frame supported by transport wheels, and a turntable supporting a hitch member for attachment to a conventional three-point hitch connection on an implement. The hitch member is connected to a horizontally extending arm of the turntable through a linkage assembly including upper and lower link structures defining a parallelogram structure for moving the hitch member from a lowered field-use position to a raised transport position. In the raised transport position, the arm of the turntable supports an implement in cantilever relationship to a pivot member supporting the arm for pivotal movement. During pivotal movement of the arm, the supported implement is pivoted from an orientation with its long axis extending transverse to the longitudinal axis of the trailer to a position where the long axis of the implement is extending parallel to the longitudinal axis of the trailer. In moving the implement to its raised transport position, the center of gravity of the implement is moved forwardly of the pivot member, and the linkage assembly is moved to an over center position to provide a stable arrangement for supporting the implement and for pivoting it to its position longitudinally aligned with the axis of the trailer.

23 Claims, 12 Drawing Sheets

U.S. PATENT DOCUMENTS

| | | |
|---|---|---|
| 4,177,627 | 12/1979 | Cicci . |
| 4,286,918 | 9/1981 | Shannon . |
| 4,301,873 | 11/1981 | Baxter . |
| 4,319,643 | 3/1982 | Carter et al. . |
| 4,359,854 | 11/1982 | Witzel . |
| 4,402,368 | 9/1983 | Moberly . |
| 4,406,329 | 9/1983 | Schlueter . |
| 4,450,918 | 5/1984 | Danford . |
| 4,518,046 | 5/1985 | Rettig et al. . |
| 4,721,168 | 1/1988 | Kinzenbaw . |
| 4,724,661 | 2/1988 | Blakeslee et al. . |
| 4,986,064 | 1/1991 | Ermacora . |
| 5,169,279 | 12/1992 | Zimmerman . |
| 5,193,623 | 3/1993 | Burette . |
| 5,346,019 | 9/1994 | Kinzenbaw et al. . |

FOREIGN PATENT DOCUMENTS

| | | |
|---|---|---|
| 7729251 | 11/1977 | (DE) . |
| 69865 | 9/1949 | (DK) . |
| 2088212 | 9/1974 | (FR) . |

AGRICULTURAL IMPLEMENT TRAILER

BACKGROUND OF THE INVENTION

1. Field of the Invention

The present invention relates to an agricultural implement trailer, and particularly to a trailer for attaching to one of a plurality of implements and capable of lifting an implement from a field-use position and rotating the implement for transport.

2. Related Prior Art

Many farm implements, including planters, cultivators and other implements, have a very long longitudinal or width dimension extending transverse to the direction of travel for the implement as it is pulled by a tractor through a field. Such implements present a long recognized problem in relation to transporting the implements over highways and roads. Because of the longitudinal or width dimension of the implement, it is impossible to pull the implement along a public highway or road in its transversely extending field use orientation. In a well known transport configuration, the implement is oriented with its longitudinal or width dimension extending along the direction of travel, such as is shown in U.S. Pat. No. 4,060,259 (Mefferd et al.) wherein the implement is supported on auxiliary wheels and drawn by a vehicle attached to a longitudinal end of the implement.

An alternative to the transport configuration described in the aforementioned patent is the provision of a device to engage an implement at a three-point hitch connection of the implement for manipulation of the implement between two perpendicularly opposed positions. In particular, it is known to provide a wheeled carrier frame supporting a mechanism for lifting and rotating an entire implement above the carrier frame whereby the implement may be transported with the longitudinal or width dimension of the implement extending parallel to the direction of travel.

For example, U.S. Pat. No. 3,727,698 (Van Selus) discloses a lift and carrier trailer apparatus incorporating a turntable supported on a trailer body wherein a lift and support assembly is mounted on the turntable for lifting an implement and supporting it in an elevated condition with the elongated dimension of the implement extending parallel to the direction of travel of the trailer apparatus.

A further example of an apparatus for transporting an implement is disclosed in U.S. Pat. No. 4,286,918 (Shannon) which describes an implement transporter including a trailer having a lifting mechanism for engaging the three-point hitch on an implement. The weight of the implement is supported by a roller, and the lifting mechanism is guided in an arcuate path by an arm pivoted adjacent one side of the trailer whereby the supported implement may be rotated 90°. The lifting and rotating of the implement provides for shifting of the center of gravity of the implement to a position which provides for better balance of the load on the transporter.

Additionally, trailers or carts have been developed for attachment to implements for drawing an implement through a field in a field-use position. Such carts are designed to be connected to the hitch of a tractor and often include a lift mechanism to lift the implement out of the contact with the ground for transport or to facilitate maneuvering in a field. For example, U.S. Pat. No. 4,032,169 (Filan et al.) discloses an apparatus for attachment to the three-point hitch of one of a plurality of implements and including a lift mechanism for supporting the implement in an elevated position. However, this apparatus does not include means for aligning an attached implement parallel to the direction of travel to facilitate transport of the implement.

SUMMARY OF THE INVENTION

The present invention provides an agricultural implement trailer for transporting one of a plurality of implements, and for drawing an attached implement through a field in a field-use position. The trailer includes an improved lifting mechanism for supporting the weight of an implement as it is lifted to a transport position, and for providing improved weight distribution of the implement in its supported position.

The implement trailer includes a trailer body having a trailer frame and wheels supporting the trailer frame. A turntable is supported on the trailer frame and includes an arm having first and second ends, and a pivot member connects the first end of the arm to the trailer frame for rotation of the turntable about a vertical axis.

A linkage assembly extends from the second end of the arm and is pivotally attached thereto and supports a hitch member having detachable attachment points for connection to an implement. The detachable attachment points preferably comprise quick hitch connections for attachment to and detachment from a three-point hitch on an implement.

The linkage assembly comprises upper and lower link structures which, in combination with attachment points on the arm and attachment points to the hitch member form a parallelogram structure. Lifting hydraulic cylinders are operatively connected to the hitch member for raising the hitch member and attached implement from the field-use position at the rear of the trailer body forwardly past the pivot member. The hydraulic cylinders extend from attachment points on the lower link structure to attachment points on the hitch member for exerting a force on the parallelogram structure to actuate the hitch member and attached implement in lifting movement.

The arm extends generally horizontally from the pivot member whereby the second end of the arm supports an implement attached to the hitch member in cantilever relationship to the pivot member. The pivot member is pivotable between a field-use position in which the hitch member and attached implement extend substantially transverse to the rear of the trailer body, and a transport position in which the hitch member and attached implement extend longitudinally of the trailer body.

In a further aspect of the invention, the vertical axis of rotation for the turntable is laterally offset from the longitudinal axis of the trailer frame, and the arm is laterally offset from the vertical axis of rotation such that rotation of the turntable from the field-use position where the arm is longitudinally aligned with the longitudinal axis of the trailer, to the transport position, where the arm is aligned perpendicular to the longitudinal axis of the trailer, locates the longitudinal axis of the arm forwardly of the pivot axis and laterally positions the second end of the arm adjacent one side of the trailer body. This transport position for the implement positions the implement such that the center of gravity of the supported weight is forward of the supporting wheels for the trailer frame with the longitudinal axis of the implement extending generally down the central longitudinal axis of the trailer.

Other objects and advantages of the invention will be apparent from the following description, the accompanying drawings and the appended claims.

DETAILED DESCRIPTION OF THE PREFERRED EMBODIMENT

Figure 1:
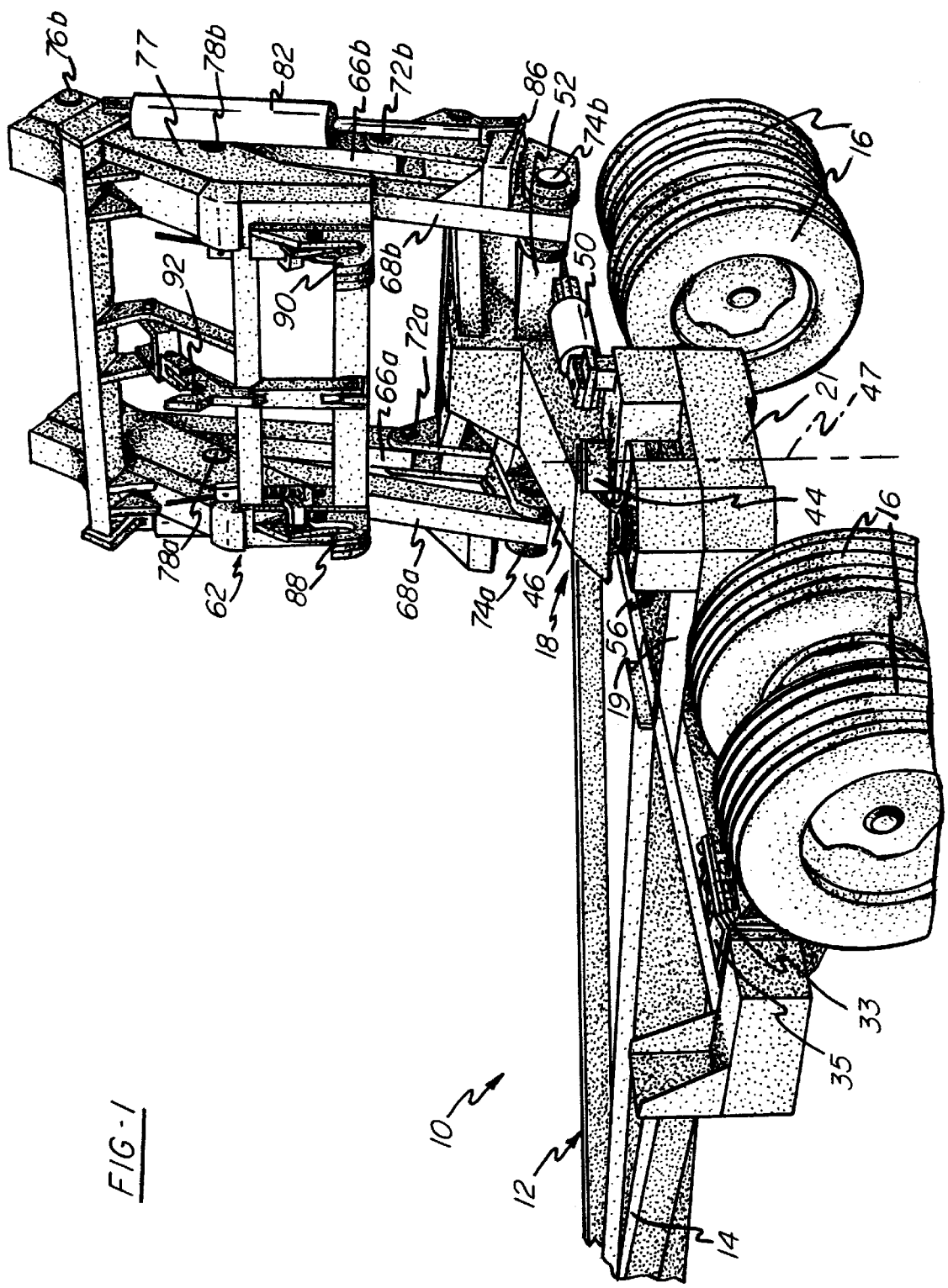
FIG. 1 is a perspective view of the trailer of the present invention in a transport position.

Referring initially to FIG. 1, the agricultural implement trailer 10 of the present invention comprises a trailer body 12 including a trailer frame 14 supported by a plurality of transport wheels 16. The frame 14 supports a turntable 18 which is adapted to mount an implement to the trailer 10 and which is shown oriented in a transport position.

Figure 2:
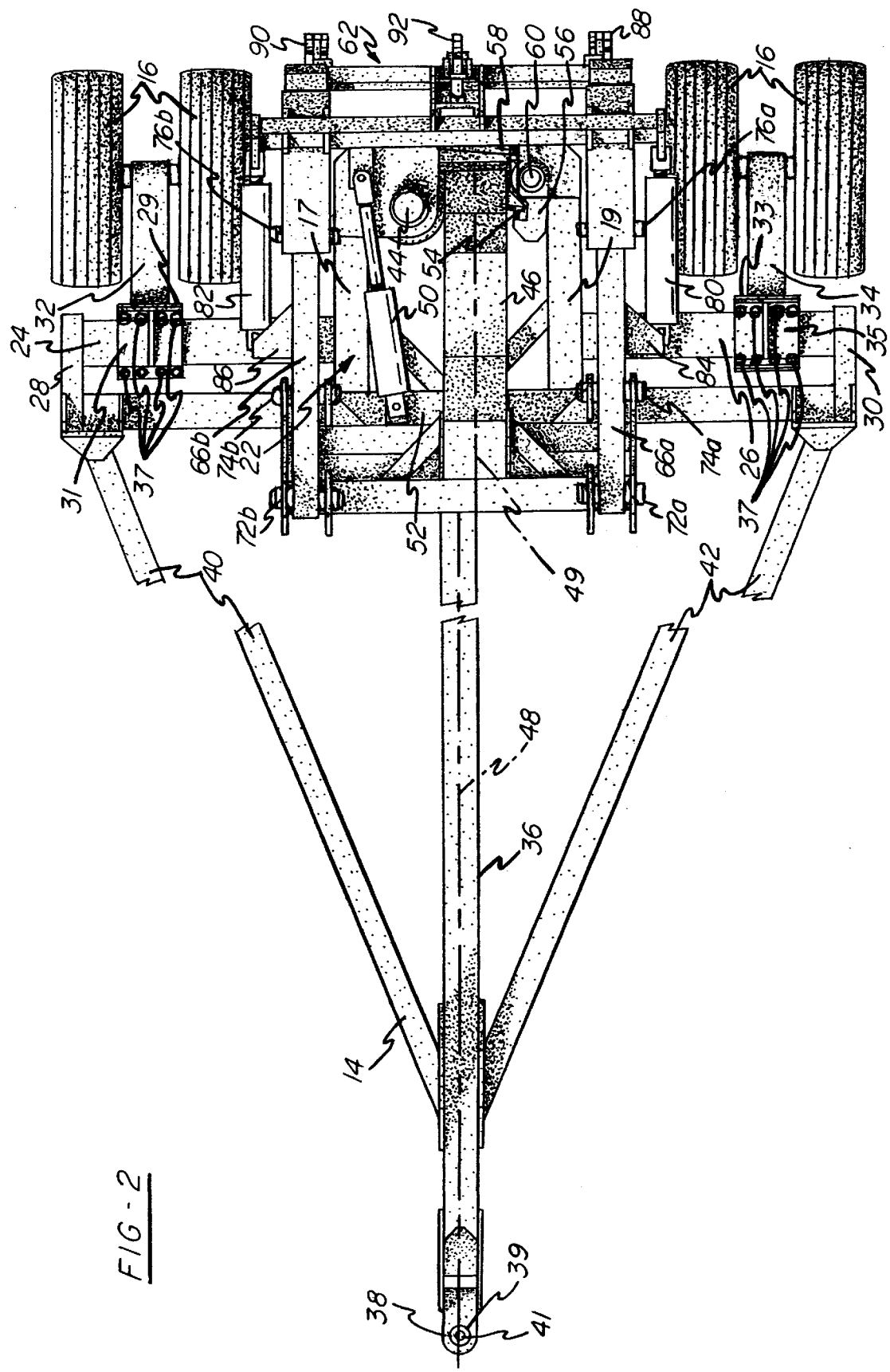
FIG. 2 is a plan view showing the trailer with the linkage assembly located in a lowered field-use position.
Figure 3:
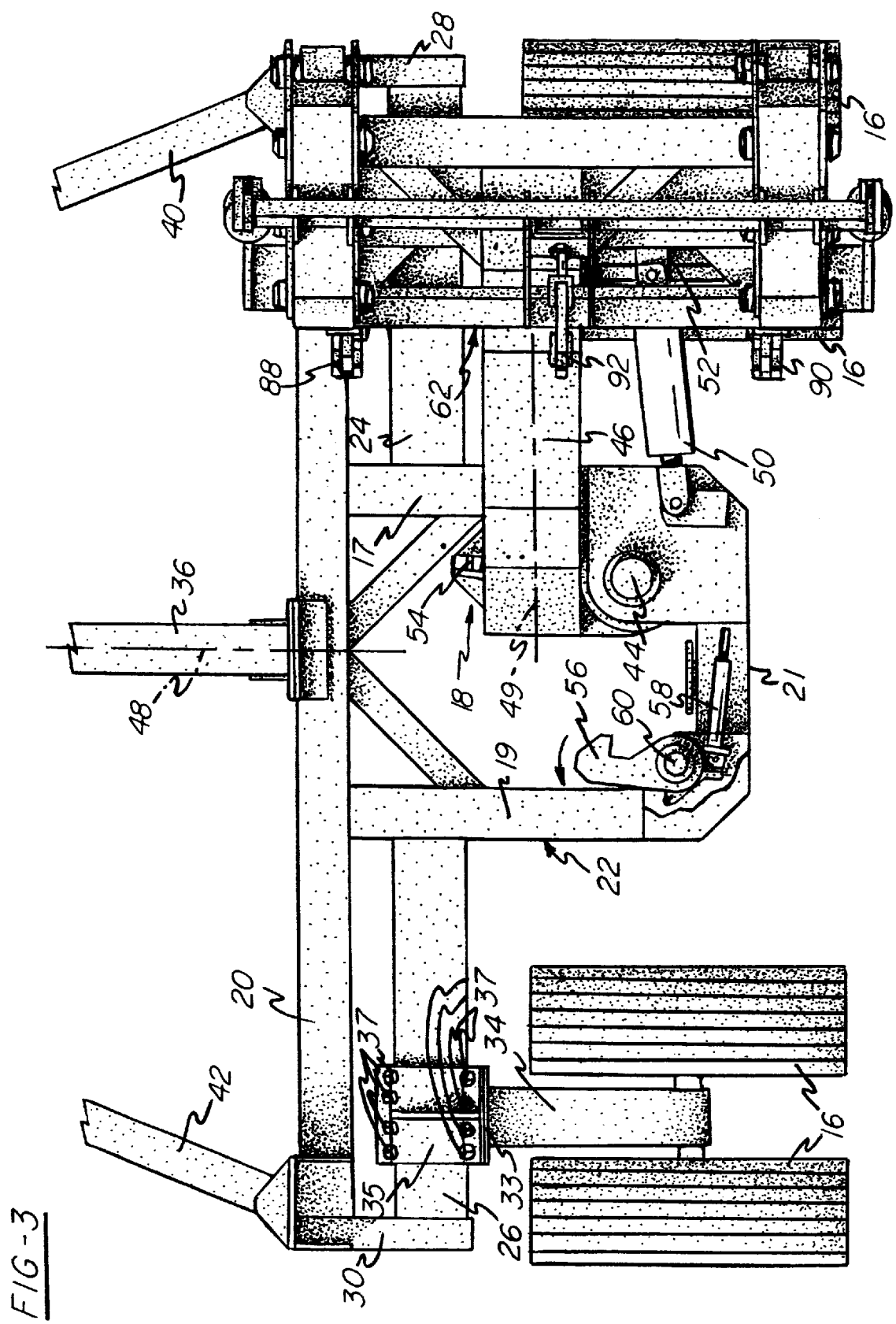
FIG. 3 is a plan view showing the rear portion of the trailer with the linkage assembly located in an implement transporting position.

Referring further to FIGS. 2 and 3, the trailer frame 14 comprises a transverse beam 20 (FIG. 3) supporting a box shaped pivot subframe 22 including subframe sections 17, 19, 21. A pair of rear frame sections 24 and 26 are supported to the transverse frame 20 by side plates 28 and 30, and the rear frame sections 24, 26 are each further attached to the subframe sections 17, 19 of the pivot subframe 22. The rear frame sections 24, 26 provide a support structure for mounting respective wheel mounting struts 32 and 34 upon which the transport wheels 16 are mounted for rotation.

The wheel mounting struts 32 and 34 are each provided with a respective pair of bracket halves 29, 31 and 33, 35 for attaching the mounting struts 32, 34 to the rear frame sections 24, 26. The bracket half 29 is rigidly attached to the mounting strut 32, and the bracket half 33 is rigidly attached to the strut 34. Fasteners 37 hold the remaining bracket halves 31, 35 with the bracket halves 29, 33 in clamping relationship around the rear frame sections 24, 26. The clamping structure of the pairs of bracket halves 29, 31 and 33, 35 provides means for permitting the lateral position of the wheel mounting struts 32, 34 to be selectively adjusted along the rear frame sections 24, 26.

The trailer frame 14 additionally includes a longitudinally extending drawbar member 36 including a forward connection end 38 for attachment to a motorized vehicle, such as an agricultural tractor, to transport the trailer 10. Angled strut members 40 and 42 extend rearwardly from a location adjacent to the connection end 38 rearwardly to locations adjacent to the side plates 28 and 30 at the transverse member 20.

A pivot member 44 is supported at one side of the subframe 22 laterally spaced from the longitudinal axis 48 of the trailer frame 12. The pivot member 44 supports an arm member 46 of the turntable 18 for rotation about a pivot axis 47 (FIG. 1) wherein the attachment point between the pivot member 44 and the arm member 46 is offset to one side of the arm member 46 such that the longitudinal axis 49 of the arm member 46 is offset relative to the longitudinal axis 48 of the trailer frame 12. The arm member 46 is supported for pivotal movement between a first position where the arm member 46 is aligned parallel to the longitudinal axis 48, and a second position where the arm member 46 is located substantially perpendicular to the longitudinal axis 48. The arm member 46 is actuated in pivotal movement by an actuator comprising a hydraulic cylinder 50 extending between a rearward portion of the pivot subframe 22 and a frame member 52 rigidly affixed to the arm member 46.

As seen in FIG. 2, the arm member 46 includes a locking ledge 54 engaged by a pivoted pawl member 56 to hold the arm member 46 locked in its first, longitudinally aligned position. A hydraulic cylinder 58 is connected between the subframe 22 and the pawl member 56 to pivot the pawl member 56 about a pivot point 60 whereby the locking ledge 54 is disengaged to permit the arm member 46 to pivot to its second position. The hydraulic cylinder 58 is preferably connected to a common hydraulic circuit with the hydraulic cylinder 50, such that pivoting of the pawl member 56 coincides with actuation of the cylinder 50 to pivot the arm 46.

Figure 4:
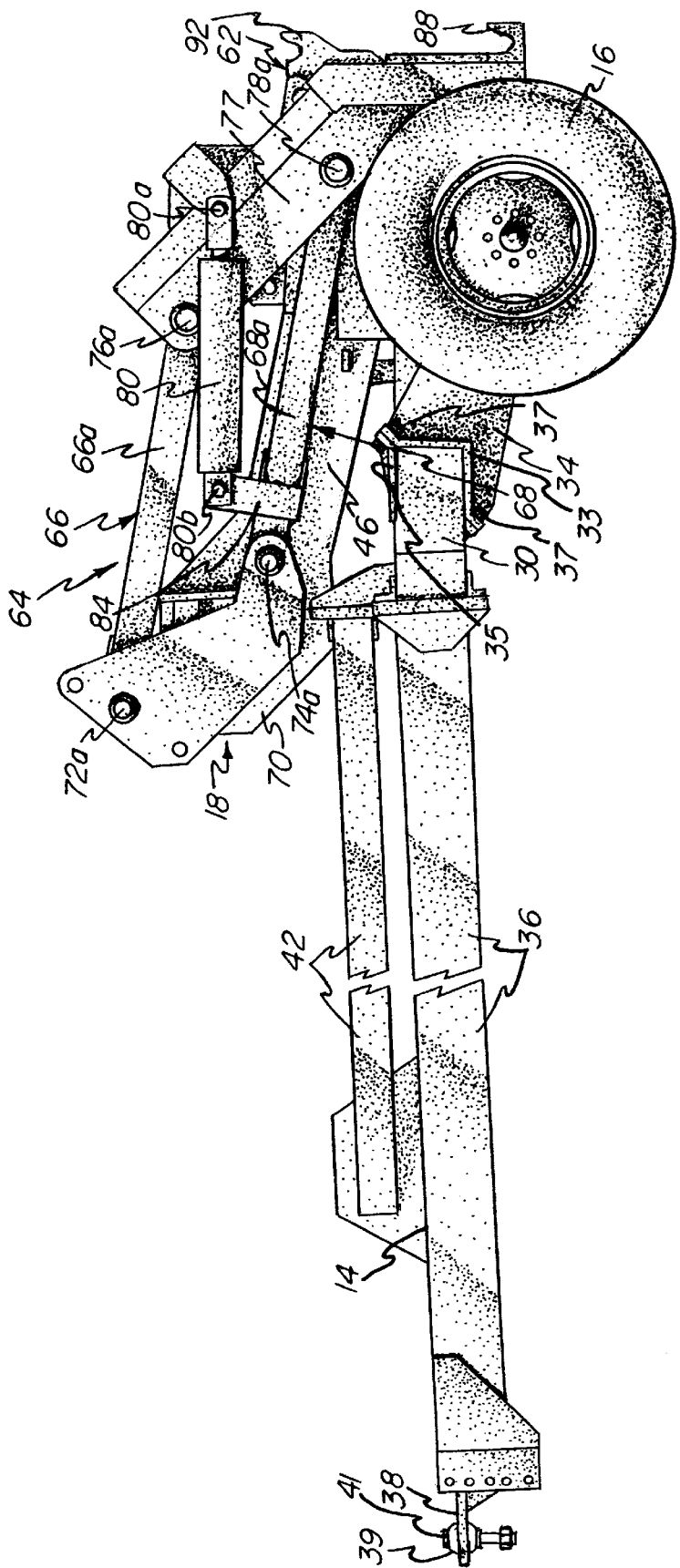
FIG. 4 is a side elevational view showing the linkage assembly in a lowered field-use position.
Figure 5:
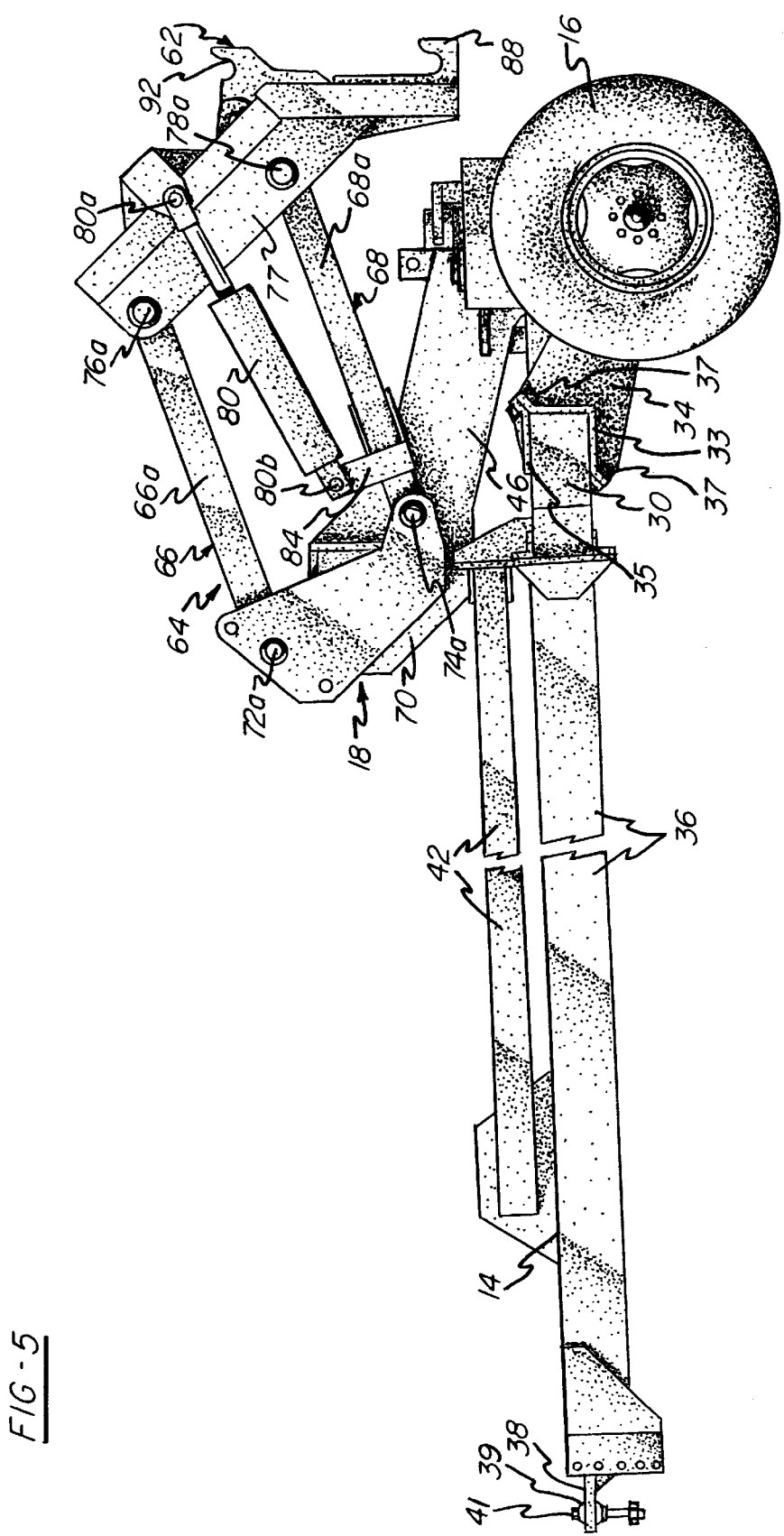
FIG. 5 is a side elevational view showing the linkage assembly in a raised field-use position.
Figure 6:
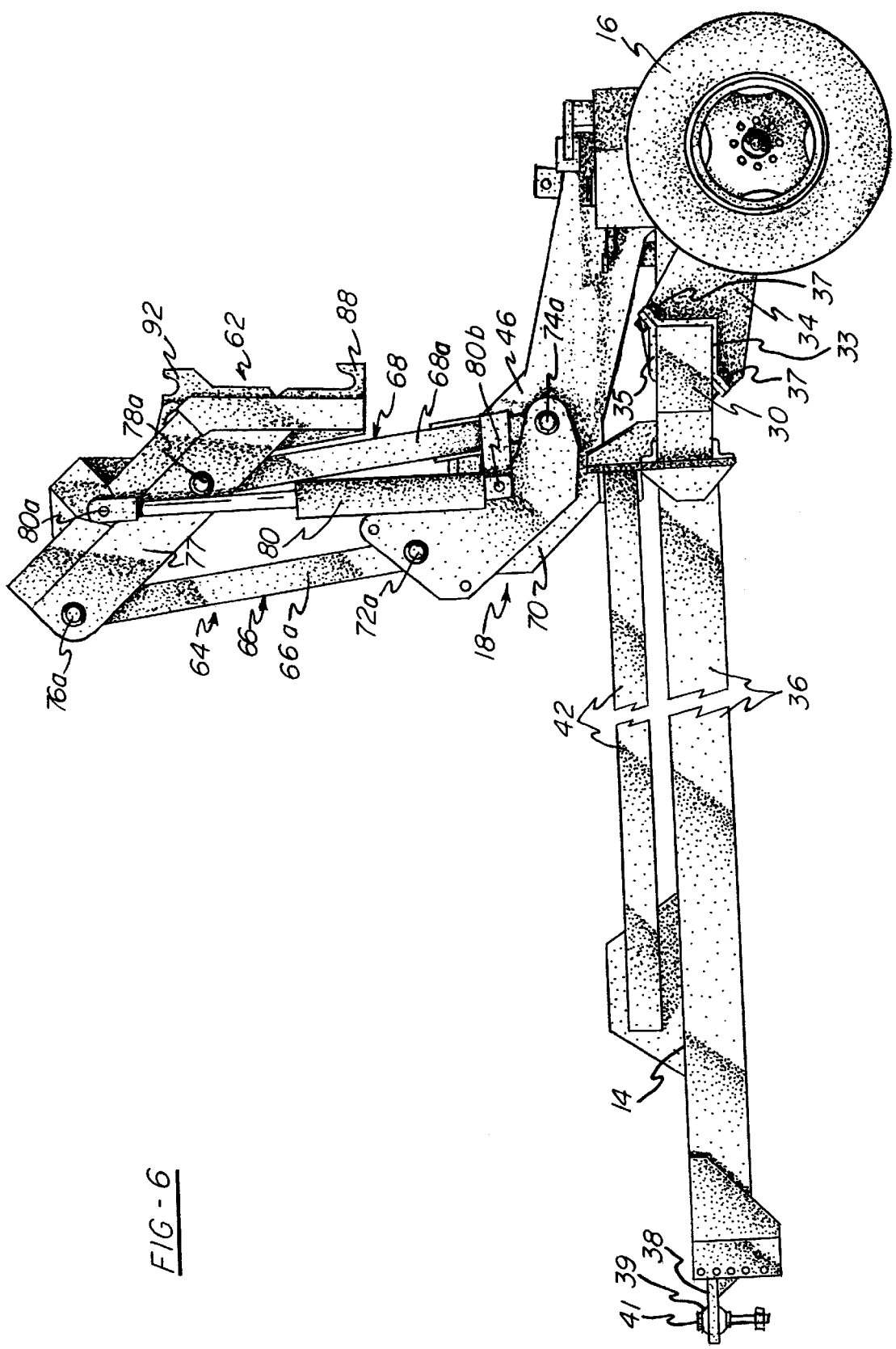
FIG. 6 is a side elevational view showing the linkage assembly in a fully raised position prior to rotation for transport.

Referring to FIGS. 4–6, a hitch member 62 is supported on the turntable 18 by means of a linkage assembly, generally indicated at 64, movably connecting the hitch member 62 to the arm 46 of the turntable 18. The linkage assembly 64 comprises an upper link structure 66, including first and second upper links 66a and 66b (see also FIG. 2), and a lower link structure 68, including first and second lower links 68a and 68b (see also FIG. 7).

Each of the upper links 66a, 66b includes a proximal end attached to an elevated portion 70 of the arm 46 at respective pivot connections 72a and 72b (FIG. 2). Similarly, each of the lower links 68a, 68b includes a proximal end attached to the arm 46 at respective pivot connections 74a and 74b (FIG. 7) wherein the lower link pivot connections 74a, 74b are located vertically spaced downwardly from and horizontally spaced closer to the arm pivot member 44 than the pivot connections 72a, 72b for the upper link structure 66.

The upper links 66a and 66b define distal ends connected to respective pivot connections 76a and 76b on an upper portion 77 of the hitch member 62, and the lower links 68a, 68b include distal ends connected to the upper portion 77 of the hitch member 62 at respective pivot connections 78a and 78b. It should be noted that the upper and lower link structures 66, 68 are substantially equal in length and define a parallelogram structure for guiding the hitch member 62 in vertical movement, as illustrated in FIGS. 4–6. It should also be noted that in the preferred embodiment, the locations for the pivot connections 72a, 72b, 74a, 74b, 76a, 76b, 78a, 78b of the upper and lower link structures 66, 68 are selected such that the hitch member 62 will tilt slightly toward the front of the trailer as it is raised. The tilting of the hitch member 62 compensates for slight rotational movement of the frame 14 about the pivot axis of the wheels 16 as the weight of an implement exerts a downward force on the rear of the frame 14. For example, when the hitch member 62 and an attached implement are lifted to a raised field-use position shown in FIG. 5, the hitch member 62 is tilted a sufficient amount ensure adequate ground clearance for the rear of the implement.

Figure 12:
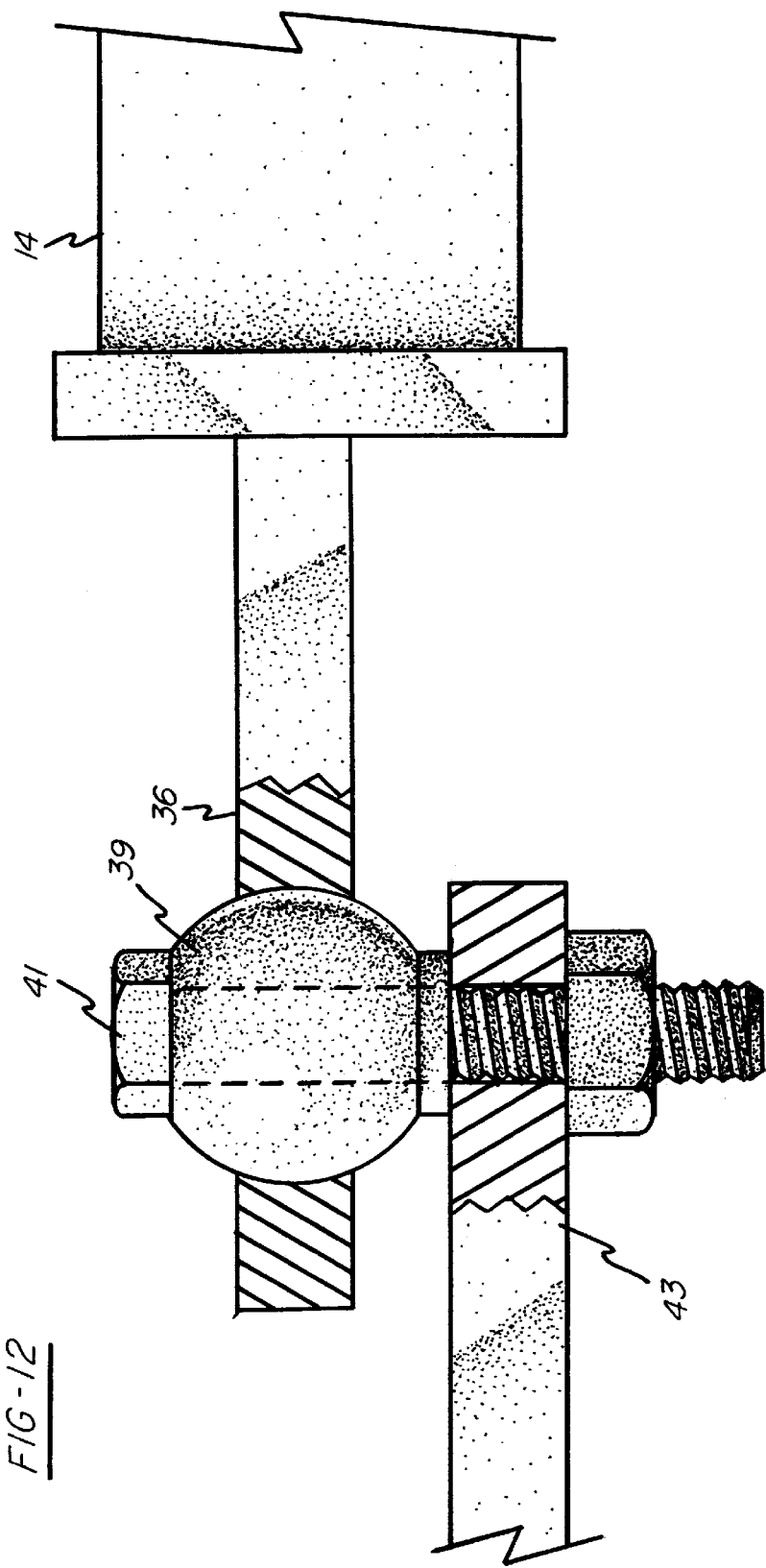
FIG. 12 is a side elevational view of the connection between the trailer of the present invention and a tractor drawbar.

Referring to FIG. 12, the forward connection end 38 of the drawbar member 36 of the trailer frame 14 is constructed to prevent or reduce drawbar "whip" resulting from forces exerted on the frame 14 by the weight of an implement as the implement is lifted and moved relative to the frame 14. Specifically, the drawbar member 36 includes a spherical ball 39 with the drawbar member 36 swaged over the ball 39 to hold the ball in place on the drawbar member 36 while permitting rotation of the ball 36 relative to the drawbar member 36. A bolt 41 extends through and clamps the ball 39 to the upper surface of a tractor drawbar 43. The spherical ball connection between the tractor drawbar 43 and the trailer drawbar member 36 substantially eliminates vertical movement therebetween during transition between negative and positive tongue loading.

In addition, it should be noted that the hitch member 62 is movable from a lowered field-use position (FIG. 4), where the hitch member 62 is located rearwardly of the pivot member 44, upwardly past the raised field-use position to a transport position (FIG. 6), where the upper and lower link structures 66, 68 have been moved to an over-center position relative to the pivot connections 72a, 72b and 74a, 74b and in which the hitch member 62 is located over the arm 46 and forwardly of the pivot member 44. The over-center position provides a stable support for the hitch member 62 during transport of an implement on the trailer 10 in that the weight of any implement supported by the hitch member 62 will bias the linkage assembly 64 to its transport position rather than downwardly to its lowered field-use position.

It should further be understood that a particular advantage associated with the linkage assembly 64 is the provision of a wide range of vertical movement for the hitch member 62. Specifically, the structure of the arm member 46 and the location of the pivot connections for the upper and lower link structures 66, 68 is such that the hitch member 62 may move downwardly to position the lower portion of the hitch member 62 in close proximity to the ground, i.e. approximately six inches from the ground. This extended range of downward movement facilitates use of the trailer when drawing an implement through field having elevation changes which place the implement at a lower elevation than the trailer 10.

Figure 7:
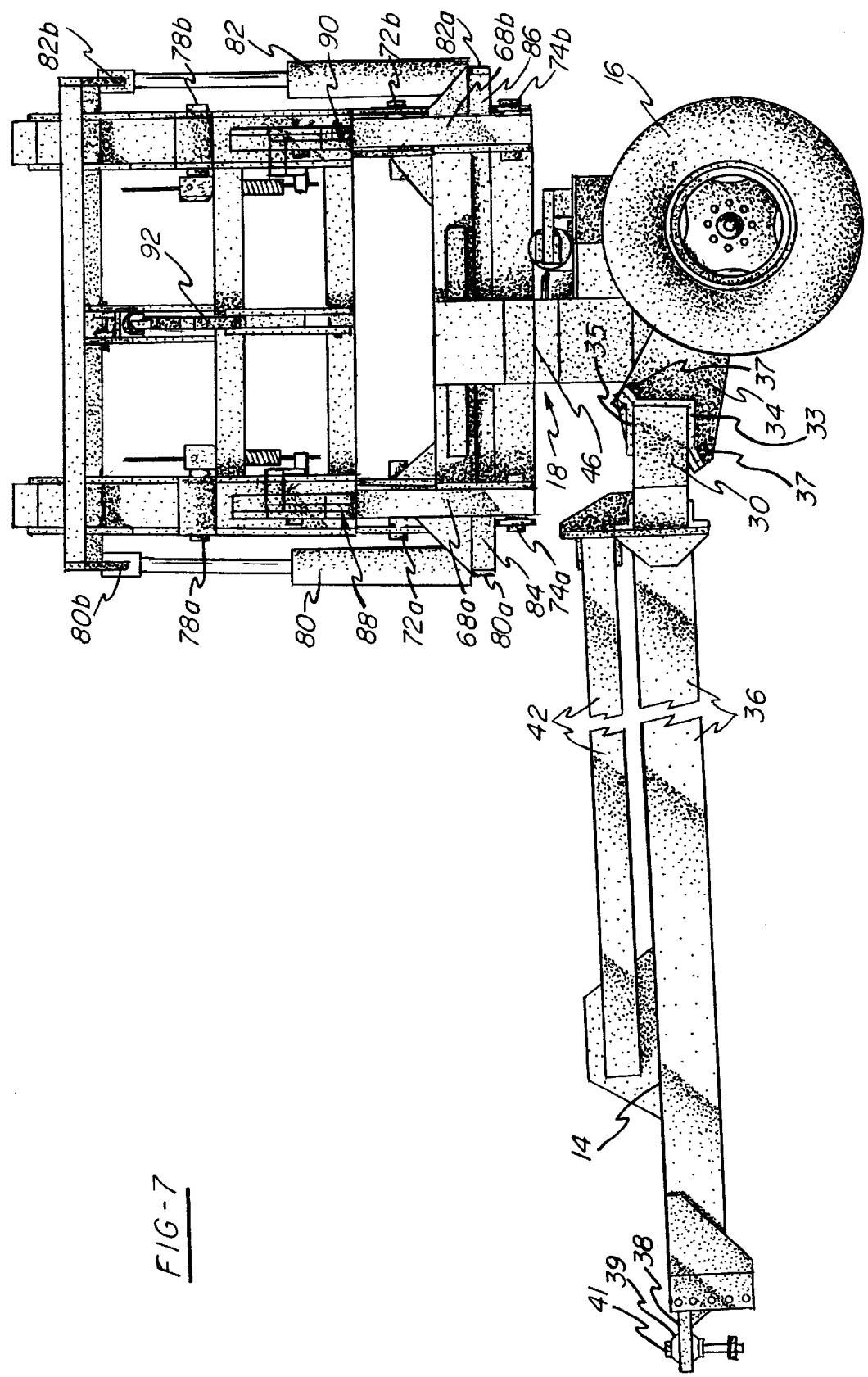
FIG. 7 is a side elevational view showing the linkage assembly in a fully raised position and pivoted for transport.

Referring to FIGS. 2 and 7, the linkage assembly 64 is actuated for movement by a pair of hydraulic cylinders 80 and 82. The hydraulic cylinder 80 includes a first, proximal connection point 80a on a cylinder support plate 84 rigidly attached to the first lower link 68a, and a second, distal attachment point 80b located on the hitch member 62. Similarly, the second hydraulic cylinder 82 includes a first, proximal connection point 82a located on a support plate 86 rigidly attached to the second lower link 68b, and a second, distal connection point 82b located on the hitch member 62.

As may be seen in FIGS. 4–6, the second connection points 80b and 82b for the cylinders 80 and 82 are located on the upper portion 77 of the hitch member 62 between the distal ends of the upper and lower link structures 66, 68 such that extension of the cylinders 80, 82 exerts an outward force on one side of the parallelogram structure. This outward force causes the link structures 66, 68 to pivot upwardly and lift the hitch member 62 to its upper, transport position, during which movement, the proximal ends of the cylinders 80, 82 move in an arcuate path about the lower link pivot connections 74a, 74b as they pivot with the lower links 68a, 68b.

Figure 8:
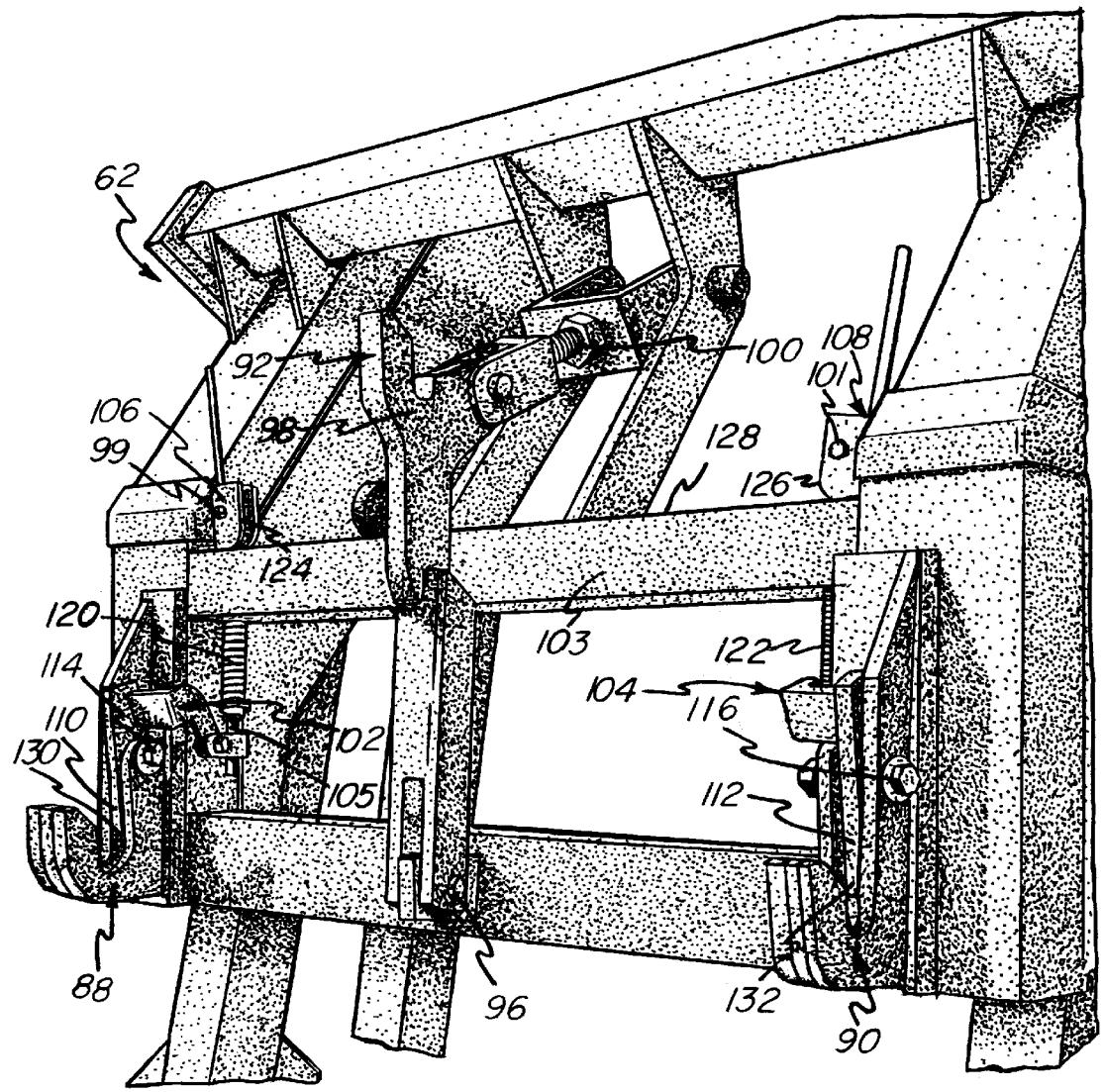
FIG. 8 is a perspective view illustrating the hitch member and detachable attachment points for attachment to an implement having a three-point hitch wherein the lower detachable attachment points are shown in an unlatched position.
Figure 9:
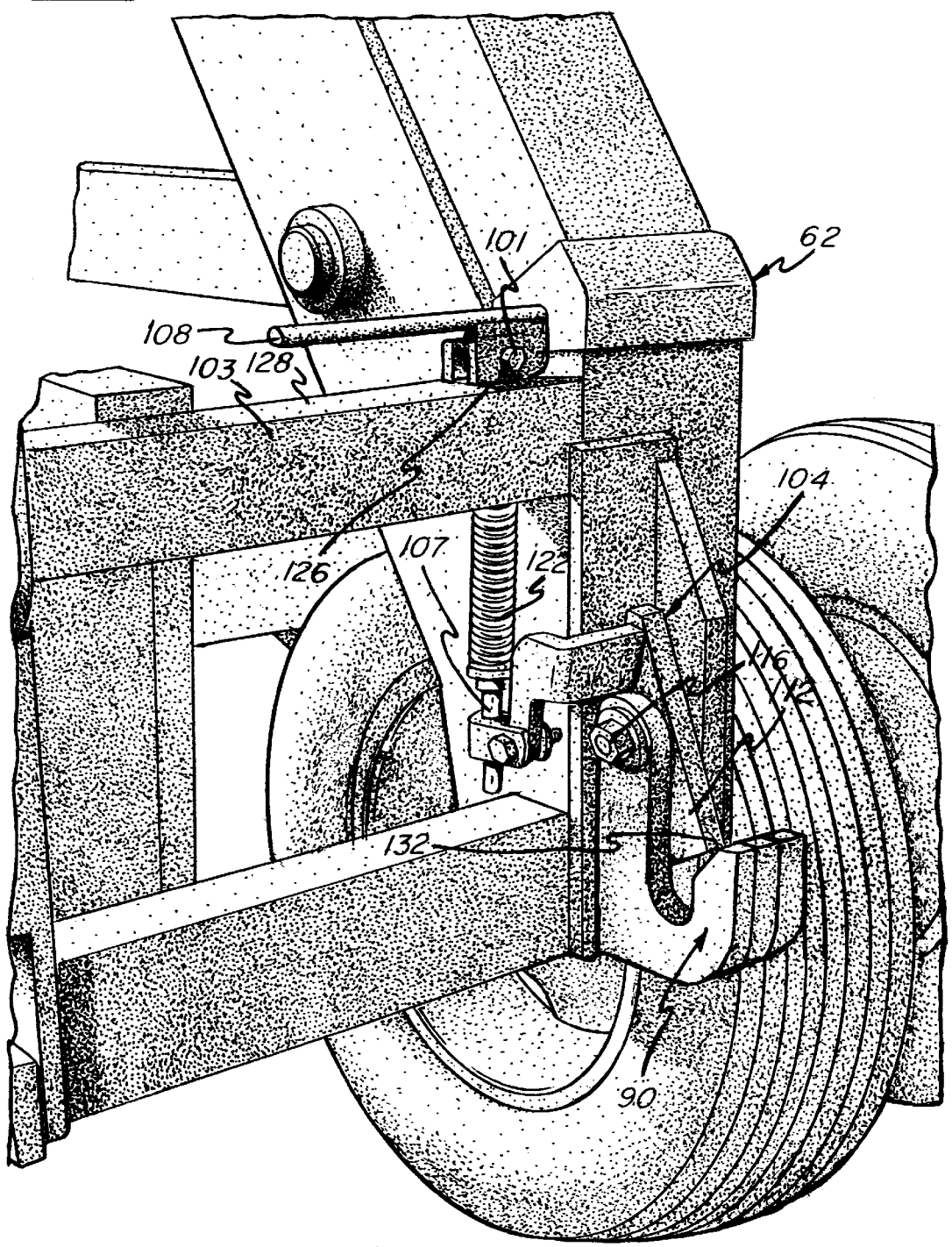
FIG. 9 is a perspective view illustrating one of the lower detachable attachment points in a latched position.

Referring to FIGS. 8 and 9, the hitch member 62 comprises a quick hitch structure for attachment to and detachment from conventional three-point hitch connections on implements. Specifically, the hitch member 62 includes first and second lower, detachable connection points 88 and 90, and an upper, detachable attachment point 92 located centrally between the lower attachment points 88 and 90. The upper attachment point 92 comprises an upwardly facing slot defined on a vertically extending bar 94 having a pivoted lower end 96 and an upper end 98 which is horizontally adjustable outwardly by means of a threaded adjustment connection 100.

Each of the lower attachment points 88, 90 comprise an upwardly facing slot and include a respective locking mechanism 102 and 104 for locking a connecting bar of the implement connection in the attachment points 88, 90. In the view shown in FIG. 8, the locking mechanisms 102, 104 are shown in the unlocked position for permitting removal of the implement connection structure.

Each of the locking mechanisms 102, 104 comprises a lever 106, 108 pivotally attached to the upper end of a respective rod 105, 107 (FIGS. 8 and 9) at the pivot points 99, 101. The rods 105, 107 are supported in sliding engagement through a horizontal bar 103 of the hitch member 62, and each rod 105, 107 is biased downwardly by a corresponding spring 120, 122. In addition, each lever 106, 108 includes a respective cam portion 124, 126 engaged with an upper surface 128 of the horizontal bar 103 wherein pivotal movement of the levers 106, 108 from a horizontal to a vertical orientation draws the rods 105, 107 upwardly relative to the horizontal bar 103.

The lower ends of the rods 105, 107 are each pivotally connected to an upper end of a respective pawl member 110, 112. The pawl members 110, 112 are pivotally mounted on the lower attachment points 88, 90 at pivot connections 114, 116 to pivot lower portions 130, 132 of the pawl members 110, 112 across the upwardly facing slots of the lower attachment points 88, 90. As illustrated in FIG. 9, the lever 108 is pivoted downwardly, and the spring 122 biases the rod 107 to a lower position, causing the lower portion 132 of the pawl member 112 to extend across the open side of the attachment point 90. Thus, a connection bar of an implement extending through the attachment point 90 is prevented from moving out of engagement with the attachment point 90 to thereby lock an implement to the hitch member 62. Release of the implement is accomplished by pivoting the levers 106, 108 upwardly to pivot the pawl members 110, 112 inwardly.

It should be noted that when the pawl members 110, 112 are located in the position shown in FIG. 9, the springs 120, 122 will permit the pawl members 120, 122 to pivot inwardly in response to a force applied to the outer edges thereof. such that the pawl members 120, 122 provide for automatic locking of the implement connections as they are engaged against the outside of the pawl members 110, 112 and inserted into the attachment points 88, 90.

Figure 10:
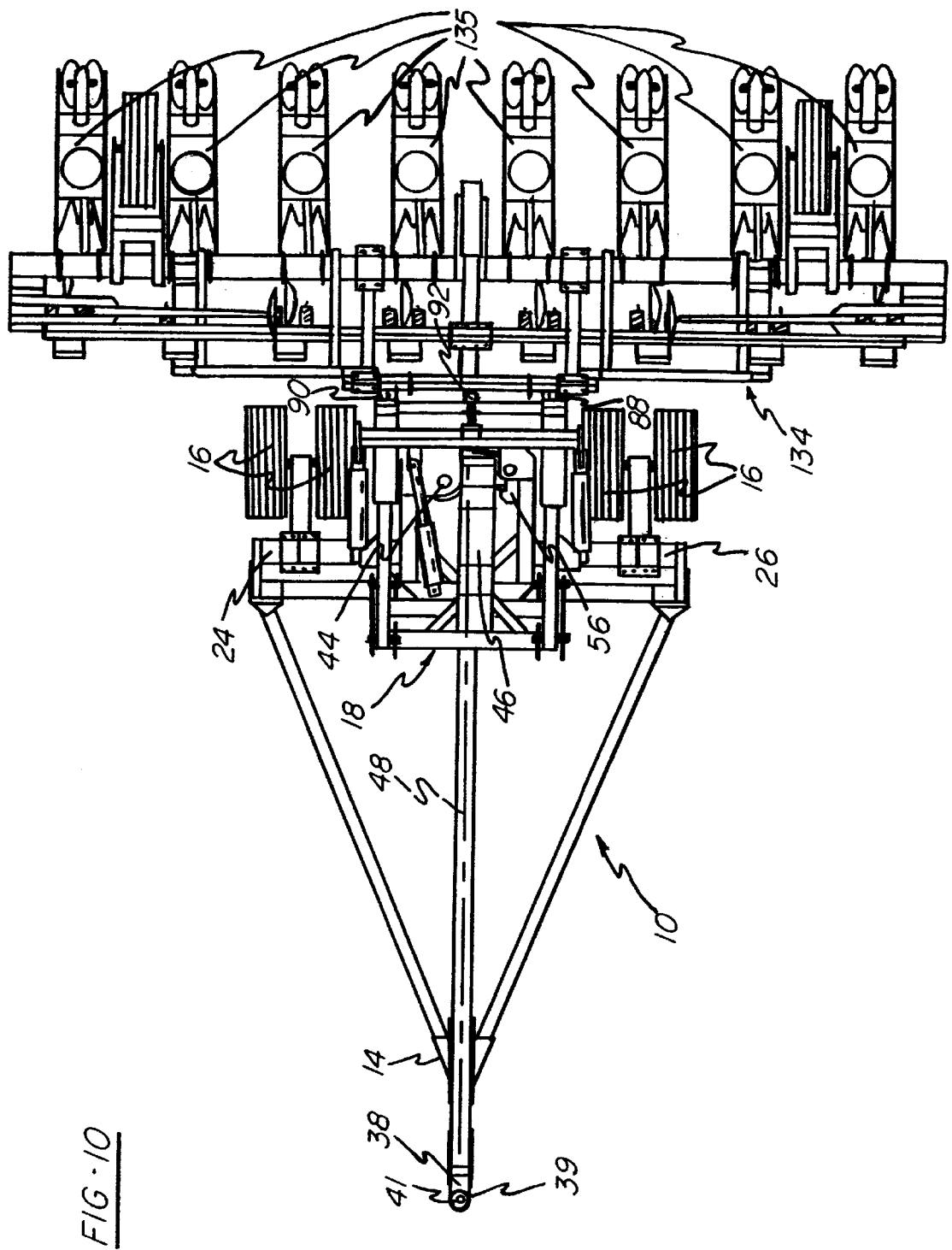
FIG. 10 is a plan view showing an implement attached to the trailer in a field-use position.

In operation, the trailer 10 is connected to an implement by aligning the connection points 88, 90, 92 of the hitch member 62 with the three-point hitch connections on the implement, with the hitch member 62 located generally in the lowered field-use position illustrated in FIG. 4. FIG. 10 further illustrates the trailer 10 shown in combination with an implement 134 located extending transversely of the trailer 10 in the lowered field-use position. As noted previously, the positions of the wheels 16 are adjustable transversely of the trailer 10 along the rear frame sections 24, 26. The particular lateral positions of the wheels 16 are selected with reference to the implement 134, for example, such that the wheels 16 are located between the lines of travel of planter units 135.

When the turntable 18 and attached implement 134 are located in the field-use positions, that is, either the lowered position shown in FIG. 4 or the raised position shown in FIG. 5, the pawl member 56 effectively locks the arm member 46 against rotational movement caused by forces on the implement 134 such as draw forces resulting from engagement with the ground or inertia forces associated with the mass of the implement 134 extending to either side of the trailer 10. In addition, it should be understood that stability of the arm member 46 in the field-use positions is facilitated by locating the arm member 46 parallel to the longitudinal axis 48 of the trailer 10 with the pivot member 44 and pawl member 56 located on either side of the arm member 46 to rigidly locate the arm member 46 against movement.

Figure 11:
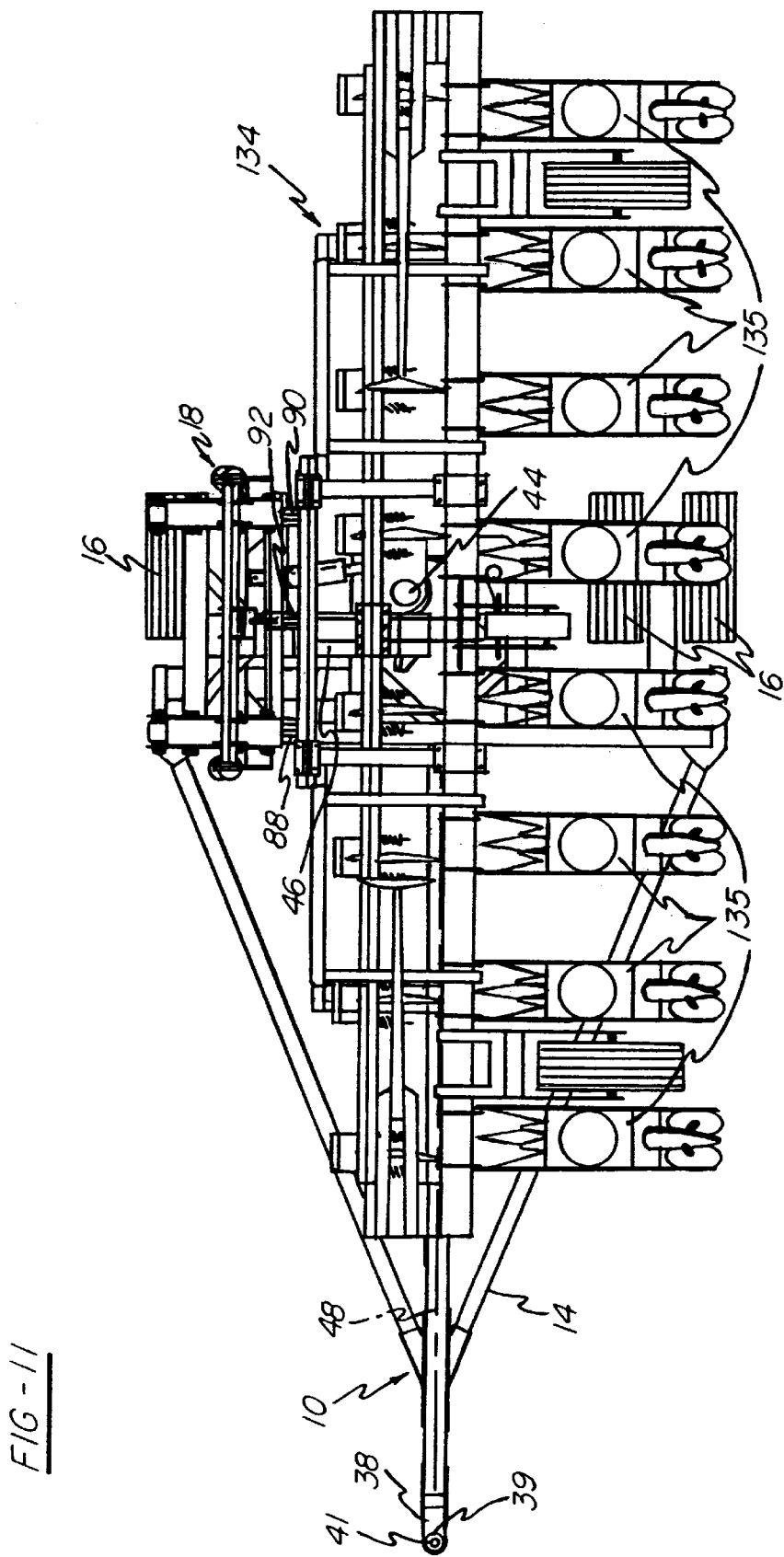
FIG. 11 is a plan view showing an implement attached to the trailer in a transport position.

FIG. 11 further illustrates the combination of the trailer 10 and the implement 134 with the turntable 18 pivoted to align the implement 134 parallel to the longitudinal axis 48 of the trailer. As can be seen in this view, the arm member 46 supports the front of the implement 134 adjacent one side of the trailer frame 14 such that the weight of the implement is substantially centered over the frame 14 of the trailer 10.

In view of the above description, it should be apparent that the trailer 10 of the present invention may be quickly attached to and detached from any one of a plurality of implements incorporating a conventional three-point hitch connection structure. Further, the turntable 18 is adapted to lift an implement attached to the hitch member 62 from a field-use position located rearwardly of the trailer frame 12 to an elevated transport position where the implement and hitch member 62 are supported by the arm 46 in cantilever relationship relative to the pivot member 44. In the transport position, the linkage assembly 64 supports an implement in an over-center position, locating the center of gravity of the implement forwardly of the rotational axis 47 of the pivot member 44. In addition, pivotal movement of the arm 46 from parallel alignment with the longitudinal axis 48 of the trailer to a perpendicular position relative to the longitudinal axis 48 positions the supporting linkage assembly 64 adjacent to one side of the trailer frame 12 to generally locate the center of gravity of the supported implement at the longitudinal axis 48 of the trailer 10.

Thus, the present invention provides a stable structure for connection to and support of an implement wherein the implement may be attached to the trailer in a field-use position extending transverse to the longitudinal axis 48 of the trailer, and moved to a transport position with the long dimension of the implement extending parallel to the longitudinal axis 48, and with the dimensions of the implement substantially contained between the sides of the trailer frame 12 to provide for convenient transport along public roads.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An agricultural implement trailer for supporting one of a plurality of implements for field usage and transport, said trailer comprising:
   (a) a trailer body including a trailer frame and wheels supporting said trailer frame;
   (b) a turntable including an arm having first and second ends, and a pivot member connecting said first end of said arm to said trailer frame for rotation of said turntable about a vertical axis;
   (c) a hitch member comprising attachment points for connection to an implement;
   (d) a linkage assembly including a proximal end pivotally attached to said arm adjacent said second end of said arm, and said linkage assembly including a distal end supporting said hitch member; and
   (e) said arm extending generally horizontally from said pivot member whereby said second end of said arm supports an implement attached to said hitch member in cantilever relationship to said pivot member, and wherein said turntable is pivotable between a field-use position in which said hitch member and attached implement extend substantially transverse to the rear of said trailer body and a transport position in which said hitch member and attached implement extend longitudinally of said trailer body.

2. The implement trailer as recited in claim 1, in which:
   (f) said second end of said arm is located forwardly of said pivot member in said field-use position.

3. The implement trailer as recited in claim 1, in which:
   (f) said linkage assembly comprises upper and lower link structures, each of said upper and lower link structures including proximal and distal ends defining said proximal and distal ends of said linkage assembly.

4. The implement trailer as recited in claim 3, in which:
   (g) a hydraulic cylinder is operatively connected to said hitch member for raising said hitch member and attached implement and for moving said hitch member from the rear of said trailer body forwardly past said pivot member, said hydraulic cylinder extending from an attachment point on said lower link structure to an attachment point on said hitch member.

5. The implement trailer as recited in claim 3, in which:
   (g) said proximal ends of said upper and lower link structures are horizontally and vertically offset from each other such that the proximal end of said lower link structure is closer to said vertical axis of rotation of said turntable than said proximal end of said upper link structure.

6. The implement trailer as recited in claim 5, in which:
   (h) said upper and lower link structures are of generally equal length and define a parallelogram structure.

7. The implement trailer as recited in claim 6, in which:
   (i) said upper and lower link structures are pivotable upwardly to an over-center position during movement of said hitch member from a lowered position to a raised position.

8. The implement trailer as recited in claim 1, in which:
   (f) said vertical axis of rotation for said turntable is laterally offset from a longitudinal axis of said trailer frame; and
   (g) said arm defines a longitudinal axis laterally offset from said vertical axis of rotation for said turntable such that rotation of said turntable during movement of said turntable from said field-use position to said transport position locates the longitudinal axis of said arm forwardly of said pivot axis and laterally positions said second end of said arm adjacent one side of said trailer body.

9. The implement trailer as recited in claim 1, in which:
   (f) said attachment points comprise quick hitch connections for attachment to and detachment from a three-point hitch on an implement.

10. The implement trailer as recited in claim 9, in which:
(g) said quick hitch connections include slots for receiving the three-point hitch of an implement, and spring biased pawl members movable over open ends of said slots for maintaining elements of the three-point hitch in engagement within said slots.

11. An agricultural implement trailer for supporting one of a plurality of implements for field usage and transport, said trailer comprising:
(a) a trailer body including a trailer frame and wheels supporting said trailer frame;
(b) a turntable and a pivot member connecting said turntable to said trailer frame for rotation of said turntable about a vertical axis;
(c) a hitch member comprising attachment points for connection to an implement;
(d) upper and lower link structures, each of said upper and lower link structures including a proximal end pivotally attached to said turntable, and each of said upper and lower link structures including a distal end supporting said hitch member with said hitch member extending between said distal ends of said upper and lower link structures:
(e) said turntable is pivotable between a field-use position in which said hitch member and an attached implement extend substantially transverse to the rear of said trailer body and a transport position in which said hitch member and attached implement extend longitudinally of said trailer body; and
(f) a hydraulic cylinder operatively connected to said hitch member for raising said hitch member and attached implement, said hydraulic cylinder extending from an attachment point on one of said link structures to an attachment point on said hitch member.

12. The implement trailer as recited in claim 11, in which:
(g) said attachment point on one of said link structures comprises an attachment point on said lower link structure.

13. The implement trailer as recited in claim 11, in which:
(g) said upper and lower link structures are pivotable upwardly to an over-center position during movement of said hitch member from a lowered position to a raised position.

14. The implement trailer as recited in claim 13, in which:
(h) said proximal ends of said upper and lower link structures are horizontally and vertically offset from each other such that the proximal end of said lower link structure is closer to said vertical axis of rotation of said turntable than said proximal end of said upper link structure.

15. The implement trailer as recited in claim 11, in which:
(g) said upper and lower link structures are of generally equal length and define a parallelogram structure.

16. The implement trailer as recited in claim 11, in which:
(g) said turntable comprises a horizontally extending arm having first and second ends, said first end located adjacent said pivot member, and said pivoted ends of said upper and lower link structures being attached to said arm adjacent said second end of said arm.

17. The implement trailer as recited in claim 11, in which:
(g) said attachment points comprise quick hitch connections for attachment to and detachment from a three-point hitch on an implement.

18. An agricultural implement trailer for supporting one of a plurality of implements for field usage and transport, said trailer comprising:
(a) a trailer body including a trailer frame and wheels supporting said trailer frame;
(b) a turntable including an arm, and a pivot member connecting said arm to said trailer frame for rotation of said turntable about a vertical axis;
(c) a hitch member comprising attachment points for connection to an implement;
(d) a linkage assembly including a proximal end pivotally attached to said arm, and said linkage assembly including a distal end supporting said hitch member;
(e) said turntable is pivotable between a field-use position in which said hitch member and an attached implement extend substantially transverse to the rear of said trailer body and a transport position in which said hitch member and attached implement extend longitudinally of said trailer body;
(f) said vertical axis of rotation for said turntable is laterally offset from a longitudinal axis of said trailer frame; and
(g) said arm is laterally offset from said vertical axis of rotation for said turntable such that rotation of said turntable from said field-use position to said transport position locates the longitudinal axis of said arm forwardly of said pivot axis and laterally positions an end of said arm adjacent one side of said trailer body.

19. The implement trailer as recited in claim 18, in which:
(h) lifting hydraulic means are operatively connected to said hitch member for raising said hitch member and attached implement from the rear of the trailer to an over-center position with the hitch member located forwardly of said pivot member.

20. The implement trailer as recited in claim 19, in which:
(i) said linkage assembly includes upper and lower link structures wherein said lifting hydraulic means comprises a hydraulic cylinder extending between said lower link structure and said hitch member.

21. The implement trailer as recited in claim 18, in which:
(h) said arm includes a first end located adjacent said pivot member and a second end horizontally displaced from said first end and supporting said linkage assembly in cantilever relationship to said pivot member.

22. The implement trailer as recited in claim 21, in which:
(i) said second end of said arm is located forwardly of said pivot member in said field-use position.

23. The implement trailer as recited in claim 18, in which:
(h) said attachment points comprise quick hitch connections for attachment to and detachment from a three-point hitch on an implement.

* * * * *